US008179582B2

(12) United States Patent
Omori et al.

(10) Patent No.: US 8,179,582 B2
(45) Date of Patent: May 15, 2012

(54) MICRO ELECTRO MECHANICAL DEVICE HAVING AN OPENING BETWEEN A FIXING PORTION AND A TORSION BAR

(75) Inventors: Yasuhiro Omori, Kawasaki (JP); Osamu Tsuboi, Kawasaki (JP); Hiromitsu Soneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 12/382,133

(22) Filed: Mar. 9, 2009

(65) Prior Publication Data

US 2009/0296181 A1    Dec. 3, 2009

(30) Foreign Application Priority Data

May 28, 2008  (JP) .................................. 2008-138847

(51) Int. Cl.
*G02B 26/08* (2006.01)
(52) U.S. Cl. ................... 359/224.1; 359/225.1; 359/876
(58) Field of Classification Search ............... 359/198.1, 359/212.1, 213.1, 221.1, 221.2, 223.1, 224.1, 359/225.1, 871, 876
See application file for complete search history.

(56) References Cited

U.S. PATENT DOCUMENTS

| | | | | |
|---|---|---|---|---|
| 6,075,639 A | * | 6/2000 | Kino et al. ................. | 359/224.1 |
| 6,122,090 A | * | 9/2000 | Kino et al. ................. | 359/224.1 |
| 6,392,776 B1 | * | 5/2002 | Murakami et al. ......... | 359/224.1 |
| 7,006,268 B2 | * | 2/2006 | Orcutt ........................ | 359/221.2 |
| 7,031,041 B2 | * | 4/2006 | Mi et al. .................... | 359/224.1 |
| 2007/0261910 A1 | | 11/2007 | Kasai et al. | |
| 2008/0053224 A1 | | 3/2008 | Tsuji et al. | |

FOREIGN PATENT DOCUMENTS

| | | |
|---|---|---|
| JP | 2004-037886 | 2/2004 |
| JP | 2005-292117 | 10/2005 |
| JP | 2006-157863 | 6/2006 |

* cited by examiner

*Primary Examiner* — Frank Font
(74) *Attorney, Agent, or Firm* — Staas & Halsey LLP (57) ABSTRACT

A micro electro mechanical device includes an inner frame provided with a movable part and an outer frame provided in a circumference of the inner frame. The outer frame has a fixing part fixed by a joining material. A first torsion bar is provided between the outer frame and the inner frame so as to swingably support the inner frame on the outer frame. A first opening is formed in the outer frame in a vicinity of the first torsion bar. The first opening is positioned between the fixing part of the outer frame and the first torsion bar.

14 Claims, 9 Drawing Sheets

MICRO ELECTRO MECHANICAL DEVICE HAVING AN OPENING BETWEEN A FIXING PORTION AND A TORSION BAR

CROSS-REFERENCE TO RELATED APPLICATIONS

This application is based upon and claims the benefit of priority of the prior Japanese Patent Application No. 2008-138847, filed on May 28, 2008, the entire contents of which are incorporated herein by reference.

FIELD

The embodiment discussed herein is directed to a micro electro mechanical device.

BACKGROUND

In an optical system of a micro structure produced using a micro electro mechanical system (MEMS) technology, an optical switch is used, which directly switches an optical signal without converting the optical signal into an electric signal. Such an optical switch is advantageous in reducing a number of parts or achieving a high-speed switching operation. Especially, a multi-channel micro mirror array fabricated using a micro machining technique is compact and able to achieve high-integration. Thus, a development of such a micro mirror array has been progressed.

Figure 1A:
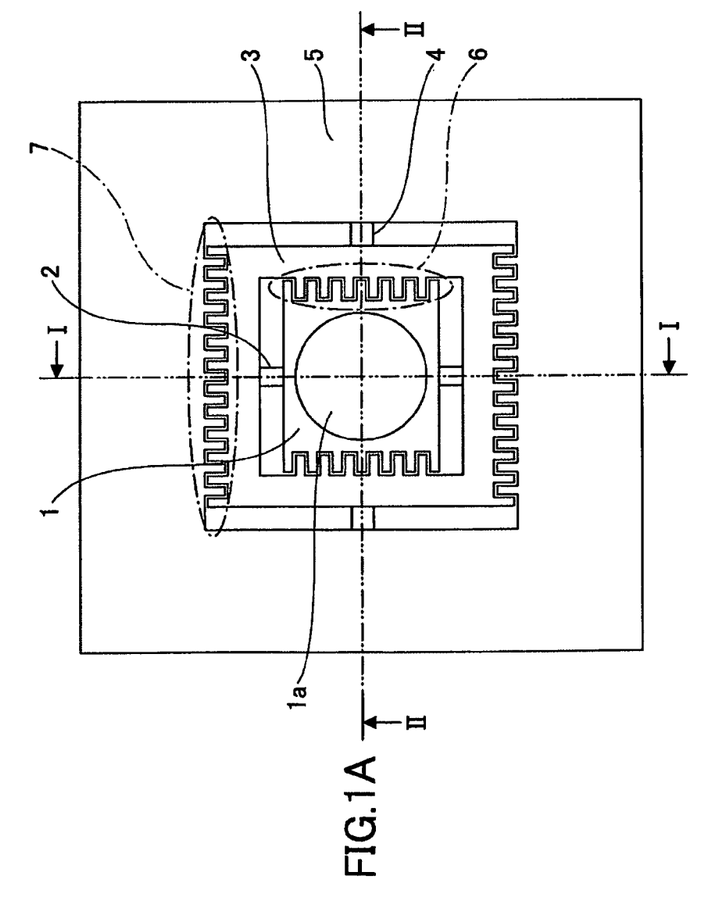
FIG. 1A is a plan view of a micro mirror device having an actuator formed by vertical comb-shaped electrodes.
Figure 1B:
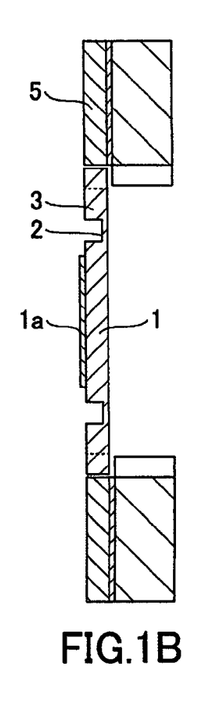
FIG. 1B is a cross-sectional view taken along a line I-I of FIG. 1A.
Figure 1C:
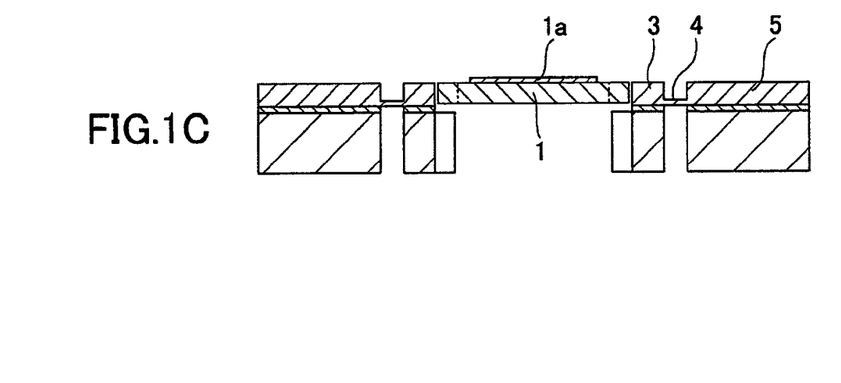
FIG. 1C is a cross-sectional view taken along a line II-II of FIG. 1A.

It is known that an actuator formed by vertical comb-shaped electrodes can provide a large swing angle (deflection angle) at a low voltage in a drive part of a micro mirror device. FIGS. 1A, 1B and 1C illustrate a micro mirror device having an actuator formed by vertical comb-shaped electrodes. FIG. 1A is a plan view of the micro mirror device. FIG. 1B is a cross-sectional view taken along a line I-I of FIG. 1A. FIG. 1C is a cross-sectional view taken along a line II-II of FIG. 1A.

The micro mirror device illustrated in FIGS. 1A, 1B and 1C has a movable part 1 having a surface on which a mirror 1a reflecting light is formed. The movable part 1 is swingably supported by a pair of torsion bars 2 on an inner frame 3. The inner frame 3 is swingably supported by a pair of torsion bars 4 on an outer frame 5.

A vertical comb-shaped electrode actuator 6 is formed in a portion where the movable part 1 and the inner frame 3 face each other. The movable part 1 can be caused to incline to the inner frame 3 by actuating the vertical comb-shaped electrode actuator 6. The torsion bars 2 are formed as beams having a small width so as to be subjected to a torsional deformation.

Also a vertical comb-shaped electrode actuator 7 is formed in a portion where the inner frame 3 and the outer frame 5 face each other. The inner frame 3 can be caused to incline to the outer frame 5 by actuating the vertical comb-shaped electrode actuator 7. The torsion bars 4 are formed as beams having a small width so as to be subjected to a torsional deformation.

The mirror 1a of the movable part 1 can be inclined in an arbitrary direction by causing the movable part 1 and the inner frame 3 to incline as mentioned above. Thereby, a light incident on the mirror 1a can be reflected in an arbitrary direction in 360 degrees.

The above-mentioned micro mirror device can be fabricated using an SOI (silicon-on-insulator) substrate. The SOI substrate is formed by an $SiO_2$ layer having a thickness of several micrometers being sandwiched between Si layers having several hundreds micrometers. The mirror 1a is provided by forming, for example, an Au layer having a high reflectance on the surface of the movable part 1.

Figure 2:
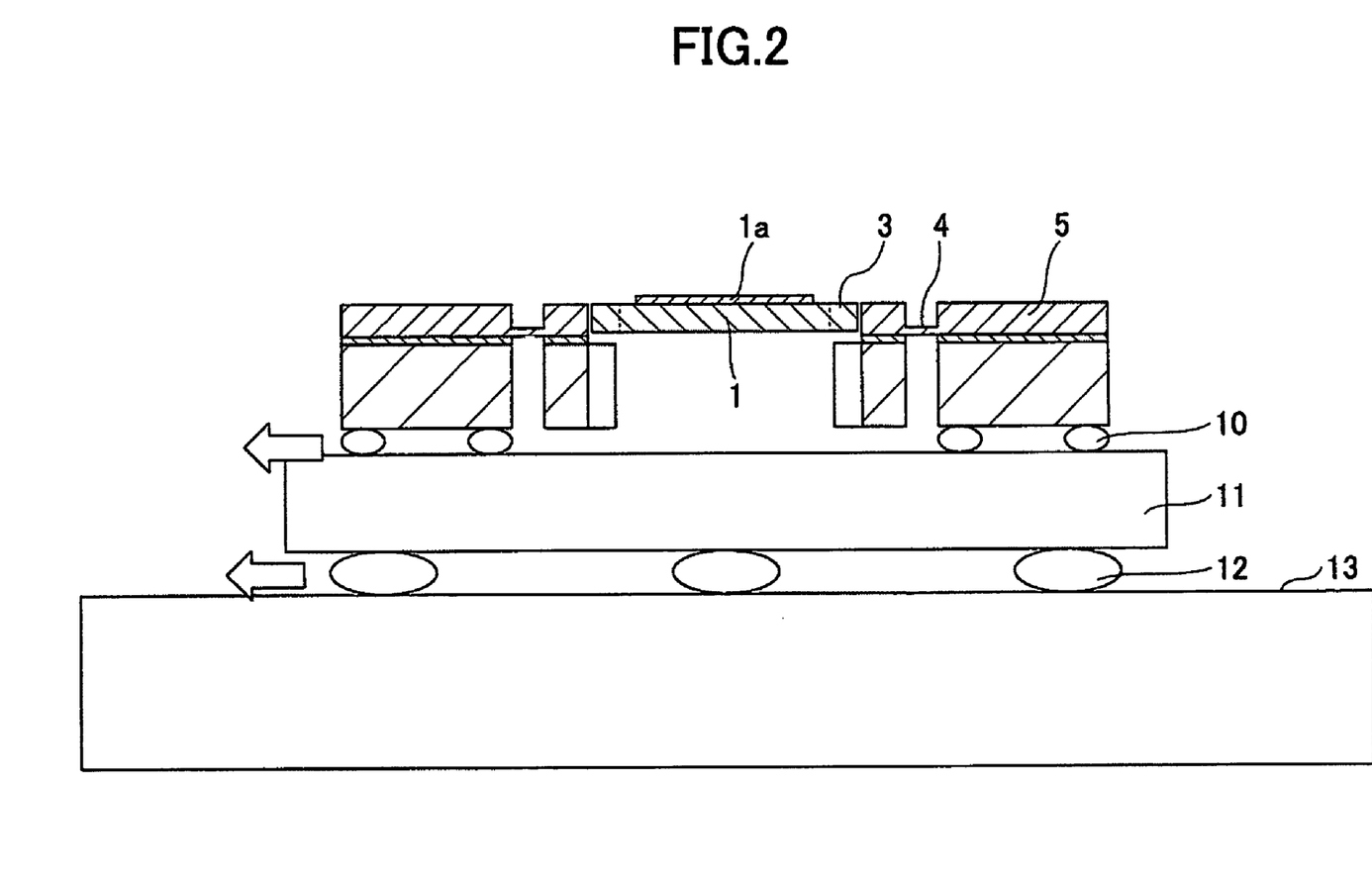
FIG. 2 is a cross-sectional view of a micro mirror device fixed to a housing (PKG) through a wiring board.

Normally, the micro mirror device is fixed to a housing or a package (PKG) of an optical device via a wiring board, or fixed directly to the housing (PKG). FIG. 2 is a cross-sectional view of a micro mirror device fixed to a housing (PKG) through a wiring board.

In FIG. 2, the outer frame 5 of the micro mirror device is fixed to the wiring board 11 by a joining material 10. As the joining material 10, if an electric conductivity is required between the outer frame 5 and the wiring board 11, an Au ball bump, a solder, an Ag paste or the like is used. If an electric conductivity is not required between the outer frame 5 and the wiring board 11, an adhesive such as a resin may be used as the joining material 10. Normally, a portion of the outer frame 5 where the outer frame 5 is fixed by the joining material 10 is located at four corners of the outer frame 5 having a square shape as illustrated in FIG. 1A, or in the vicinity of two outer sides facing the outer frame 5.

The wiring board 11 to which the micro mirror device is fixed is fixed to the housing (PKG) 13 by a joining material 12. Generally, the housing (PKG) 13 is formed of a metal such as a stainless steel.

In the fixing structure of the micro mirror device as illustrated in FIG. 2, there is a possibility of a stress being applied to the outer frame 5, which results in a slight deformation of the outer frame 5. For example, if the joining material 10 contracts when the joining material 10 is cured, a stress is generated in the outer frame 5. Or, if an ambient temperature of the micro mirror device changes, a stress is generated in the outer frame 5 due to a difference between a coefficient of thermal expansion of the micro mirror device and a coefficient of thermal expansion of the wiring board 11 and the housing (PKG). Especially, because the width of the torsion bars 4 extending between the outer frame 5 and the inner frame 3 is small, the torsion bars 4 easily deform if a stress is generated in the outer frame 5.

If the torsion bars 4 deform, a resonance frequency in the torsion vibration system of a portion containing the torsion bars 4 is changed, which results in a problem in that the characteristics of the micro mirror device is undesirably changed. This problem occurs in the torsion bars 4 connecting the inner frame 3 and the outer frame 5, which is fixed by the joining material 10, but the problem rarely occurs in the torsion bars 2 connecting the movable part 1 and the inner frame 3, which is not fixed by a joining material.

As mentioned above, in a micro electro mechanical device such as a micro mirror device, a stress is generated in the device due to a fixing structure, and there is a problem in that the characteristics of the device is changed due to the stress.

Thus, in a gyroscope sensor using the MEMS technology, it is suggested to reduce an internal stress in a Y direction (width direction) in a support board by providing a stress relaxation groove (for example, refer to Patent Document 1). Additionally, in a micro optical part formed using a micro machining technique, when a structure to cause a micro mirror to reciprocally vibrate using a torsion beam as a rotational axis is adopted, it is suggested to form a separation groove in a mirror substrate (for example, refer to Patent Document 2). Further, it is suggested to suppress a fluctuation of a resonance frequency of a vibration board by providing a slit-like etched hole in a vibration electrode board to release an internal stress generated in the vibration electrode board (refer to Patent Document 3).

Patent Document 1: Japanese Laid-Open Patent Application 2005-292117

Patent Document 2: Japanese Laid-Open Patent Application 2004-37886

Patent Document 3: Japanese Laid-Open Patent Application 2006-157863

In a micro electro mechanical device such as the above-mentioned micro mirror device, there are various structures of a drive portion or a fixing portion. Accordingly, it is desirous to use a method which can optimally relax a stress in consideration of a fixing method and a fixing position and a positional relationship with a drive portion.

Thus, it is desirous to develop a micro electro mechanical device having a structure in which a stress generated in a fixing portion is hardly transmitted to other portions such as a beam supporting a movable portion.

SUMMARY

There is provided a micro electro mechanical device including: an inner frame provided with a movable part; an outer frame provided in a circumference of the inner frame and having a fixing part being fixed by a joining material; a first torsion bar provided between the outer frame and the inner frame so as to swingably support the inner frame on said outer frame; and a first opening formed in the outer frame in a vicinity of the first torsion bar, wherein the first opening is positioned between the fixing part of the outer frame and the first torsion bar.

Additionally, there is provided a micro electro mechanical device array including: a single substrate; and a plurality of the above-mentioned micro electro mechanical devices aligned on the single substrate, wherein the first opening is formed as a single elongated opening extending in a direction of alignment of the micro electro mechanical devices.

Further, there is provided a micro mirror device including: a movable part having a mirror; an inner frame surrounding the movable part; a pair of second torsion bars provided between the movable part and the inner frame to swingably support the movable part on the inner frame; a second vertical comb-shaped electrode actuator formed between the movable part and the inner frame; an outer frame surrounding the inner frame; a pair of first torsion bars provided between the inner frame and the outer frame to swingably support the inner frame on the outer frame; and a first vertical comb-shaped electrode actuator formed between the inner frame and the outer frame, wherein the outer frame has a fixing part that is fixed to an external part by a joining material, and a first opening is formed in the outer frame between the fixing part and each of the first torsion bars.

The object and advantages of the embodiment will be realized and attained by means of the elements and combinations particularly pointed out in the appended claims.

It is to be understood that both the foregoing general description and the following detailed description are exemplary explanatory only and are not restrictive of the invention, as claimed.

DESCRIPTION OF EMBODIMENT(S)

Preferred embodiment of the present invention will be explained with reference to the accompanying drawings.

Figure 3:
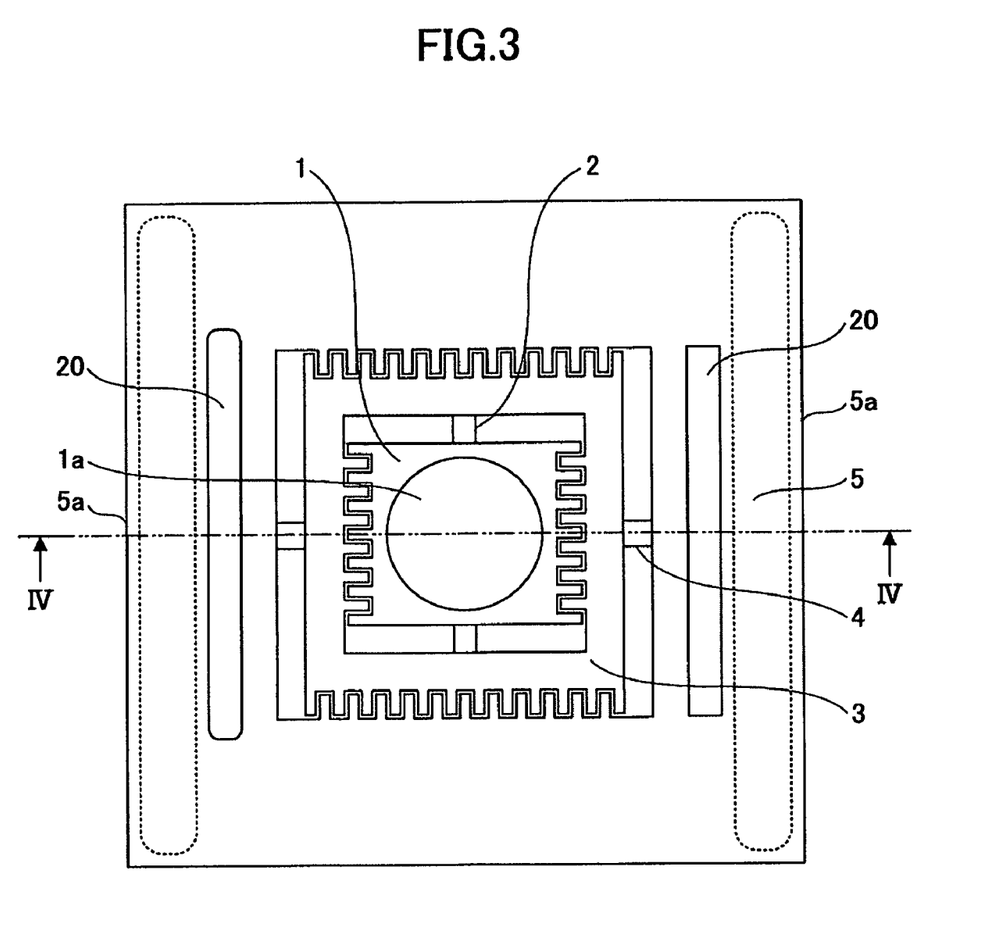
FIG. 3 is a plan view of a micro mirror device, which is an example of a micro electro mechanical device according to a first embodiment.

A description will now be given of a micro electro mechanical device according to a first embodiment. FIG. 3 is a plan view of a micro mirror device, which is an example of the micro electro mechanical device according to the first embodiment. In FIG. 3, parts that are the same as parts illustrated in FIG. 1 are given the same reference numerals, and descriptions thereof will be omitted.

The micro mirror device shown in FIG. 3 is the same as the micro mirror device illustrated in FIG. 1 in portions such as the structure of the movable part 1, the support structure according to the torsion bars 2 and 4, and the drive mechanism according to the vertical comb-shaped electrode actuators 6 and 7. However, the micro mirror device illustrated in FIG. 3 differs from the micro mirror device illustrated in FIG. 1 in that openings 20 (each corresponding to a first opening) are formed in the outer frame 5 of the micro mirror device illustrated in FIG. 3. Each torsion bar 4 corresponds to a first torsion bar, and each torsion bar 2 corresponds to a second torsion bar. The openings 20 are provided to relax a stress generated when the outer frame 5 is fixed to a wiring board so that an influence of the stress is not given to the torsion bars 4.

Figure 4:
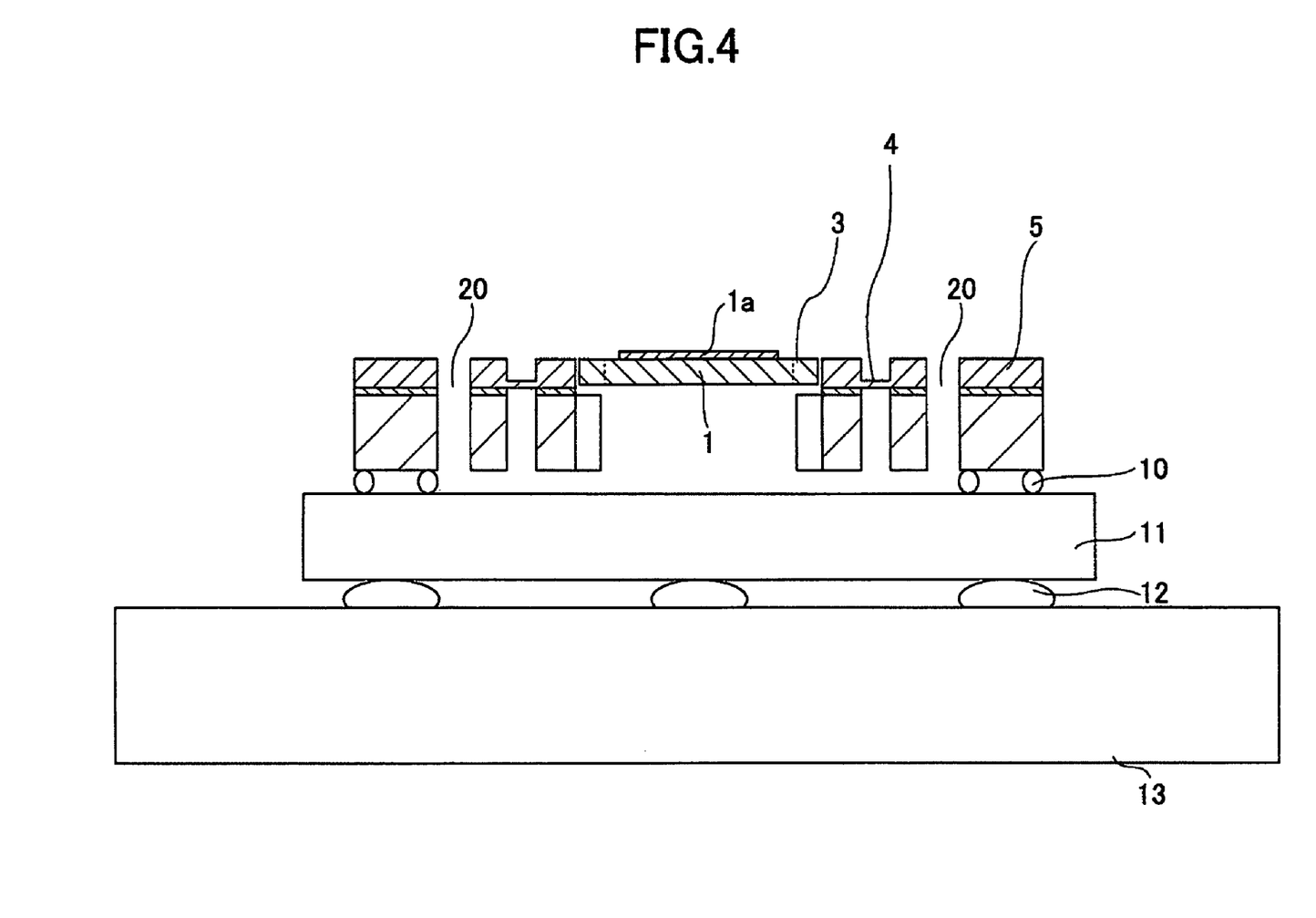
FIG. 4 is a cross-sectional view taken along a line IV-IV of FIG. 3.

The outer frame 5 is joined and fixed to the wiring board 11 by a joining material 10 (refer to FIG. 4) in areas encircled by dotted lines in FIG. 3. Each portion fixed by the joining material 10 in the outer frame 5 is located in a portion outer side than the portion where the respective torsion bar 4 exists. That is, the joining material 10 is provided along a side 5a of the outer frame 5, which extends outer side of the torsion bar 4 in an extending direction of the torsion bar 4. Each opening 20 is formed to extend between the portion fixed by the joining material 10 and the torsion bar 4.

If each opening 20 extends between the portion fixed by the joining material 10 and the torsion bar 4 and when a stress is generated in the outer frame 5 due to contraction or expansion of the portion fixed by the joining material 10, the stress is interrupted by the openings 20 and is not transmitted to the torsion bars 4. Therefore, a resonance frequency of the vibration system containing the torsion bars 4 is prevented from being fluctuated due to the stress generated in the portions fixed by the joining material 10, thereby maintaining the characteristics of the micro mirror array unchanged.

In a case where the portion fixed by the joining material 10 is an area in alignment with the side 5a of the outer frame 5 as illustrated in FIG. 3, each opening 20 is also formed in an elongated shape along the portion fixed by the joining material 10. The configuration and position of each opening 20 is set so that the opening 20 exists between the portion fixed by the joining material 10 and the corresponding torsion bar 4.

That is, the length of the opening 20 is set so that, when connecting an arbitrary position in the portion fixed by the joining material 10 and the position of connecting the torsion bar 4 and the outer frame 5 by a straight line, the opening 20 always exists therebetween. Thereby, the opening 20 always exists between the portion where a stress is generated in the outer frame 5 and the torsion bar 4, which results in prevention of transmission of the stress to the torsion bar 4 by the opening 20.

Although there is no reason for limiting the width of the opening 20, it is desirable to make the width of the opening 20 as small as possible in consideration of the strength of the outer frame 5. If the opening 20 is mere a cut, both edges of the cut may be brought into contact with each other, which results in transmission of a stress. Thus, it is desirous to make an elongated opening having a certain degree of width.

The opening 20 on the right side between the two openings 20 illustrated in FIG. 3 is configured in an elongated rectangular shape, and the each of the four corners thereof is a right angle. On the other hand, the opening 20 on the left side has four corners that are not right angles but rounded. A stress tends to be concentrated into the right angle four corners of the opening 20, and a crack may be generated from the four corners as an initiating point. Accordingly, the four corners can be prevented from generating a crack by suppressing a concentration of a stress by rounding the four corners. Thus, it is desirable to round the four corners of the opening 20. The advantage of rounding the four corners of the opening is applicable to any openings in the embodiments mentioned below.

Although the fixing portions fixed by the joining material 10 are areas along the opposite two sides of the outer frame 5 in the example illustrated in FIG. 3, the fixing portion may be provided to each of the four sides of the outer frame 5. In such a case, areas along the sides 5b perpendicular to the sides 5a are also fixed by the joining material 10. Thus, an opening 21 (corresponding to a second opening) similar to the opening 20 is provided between each of the sides 5b and the corresponding vertical comb-shaped electrode actuator 7 as illustrated in FIG. 5.

Figure 5:
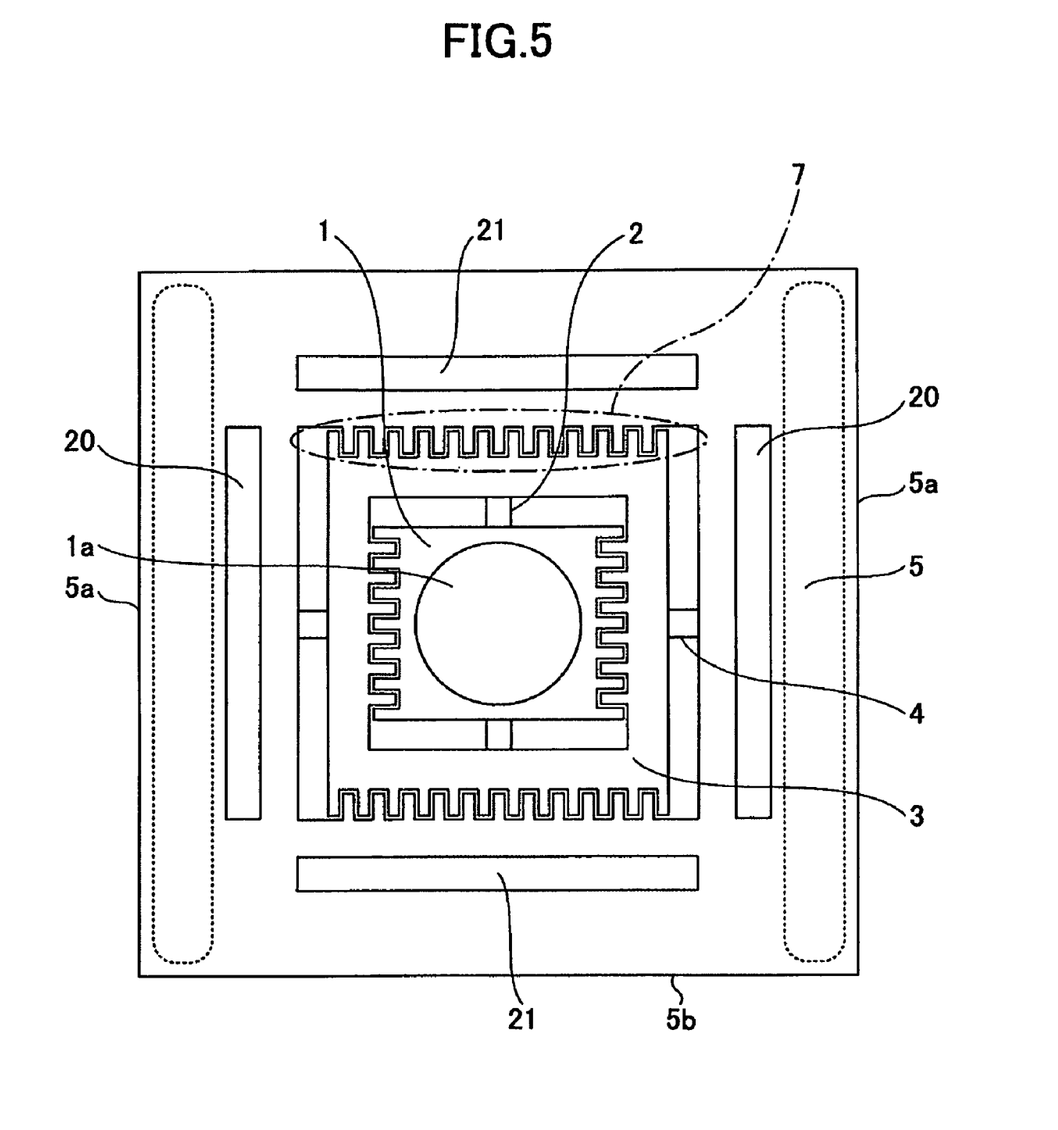
FIG. 5 is a plan view of a micro mirror having an outer frame provided with openings along four sides.

In the case of the example illustrated in FIG. 5, a torsion bar is not provided on an inner side of each side 5b but a vertical comb-shaped electrode actuator 7 is formed. Therefore, unlike the opening 20, the opening 21 formed on the inner side of each side 5b is not for preventing transmission of a stress to a torsion bar. Rather, the opening 21 provides an effect of maintaining the gap between the comb-shaped electrodes of the vertical comb-shaped electro actuator 7. That is, because the gap between the comb-shaped electrodes may be changed if the outer frame 5 deforms in the vicinity of the vertical comb-shaped electrode actuator 7, transmission of a stress to a portion where the comb-shaped electrodes is prevented by providing the opening 21. Thereby, deformation of the portion where the comb-shaped electrodes are formed is prevented, and, thus, even if a stress is generated in the fixing portion of the outer frame 5, the gap between the comb-shaped electrodes of the vertical comb-shaped electrode actuator 7 can be maintained unchanged.

Figure 6:
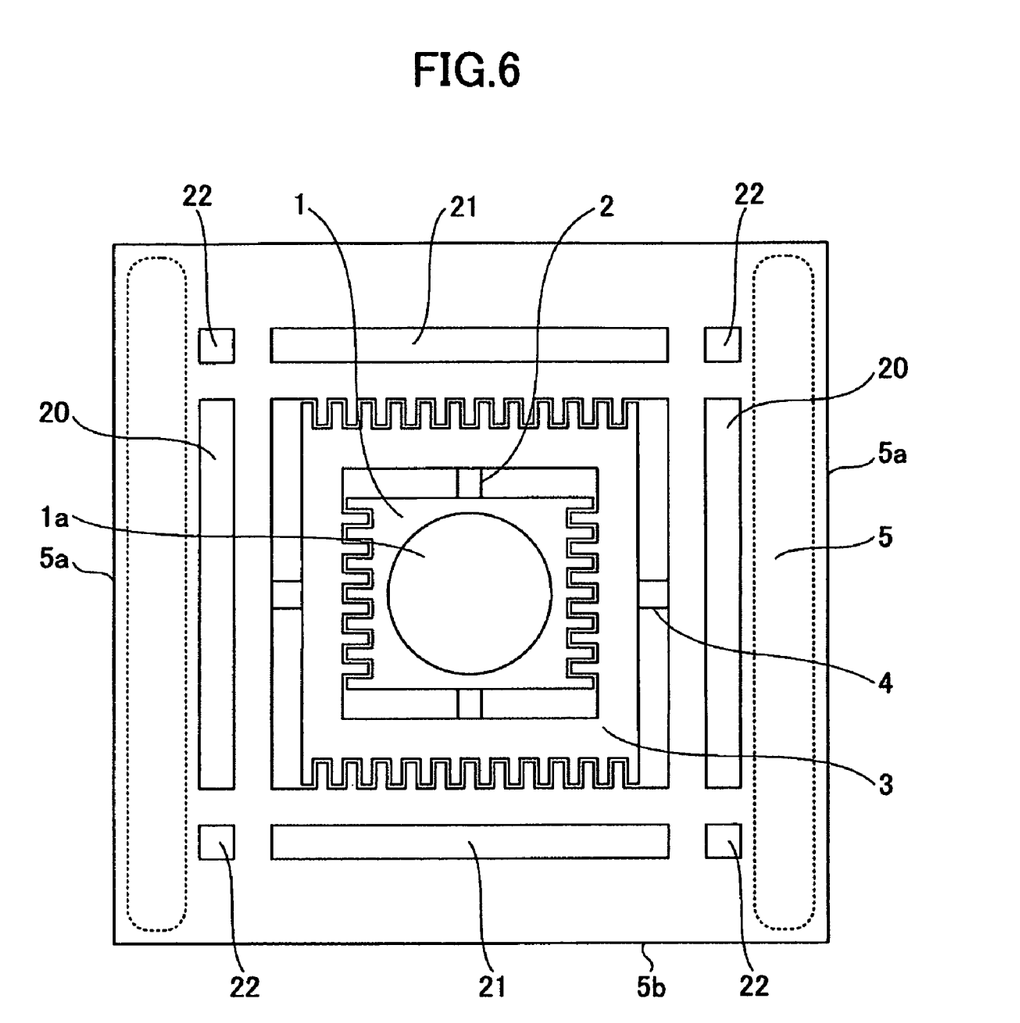
FIG. 6 is a plan view of a micro mirror having an outer frame further provided with openings between openings along four sides.

FIG. 6 is a plan view illustrating an example in which an opening 22 (corresponding to a third opening) is further provided between the opening 20 and the opening 21 in the example illustrated in FIG. 5. In the example illustrated in FIG. 5, the outside portions fixed by the joining material 10 are connected to the inside portions where the comb-shaped electrodes are formed and connected to the respective torsion bars 4 in the four corner portions of the outer frame 5. It is desirous to prevent propagation of a stress to the inside portions as much as possible. Thus, in the example illustrated in FIG. 6, the openings 22 are provided in the four corner portions of the outer frame 5 between each the opening 20 and the corresponding opening 21.

As illustrated in FIG. 6, the outer frame-like portion, which is the fixing portion fixed by the joining material 10 in the outer frame 5, and the inner frame-like portion connected to the torsion bars 4 and provided with the comb-shaped electrodes are separated by the openings 20, 21 and 22. Thus, portions between the openings 20, 21 and 22 can be regarded as beams connecting the outer frame-like portion and the inner frame-like portion. That is, it can be assumed that the outer frame 5 is divided into the inner frame-like portion and the outer frame-like portion that are connected by the beams and the outside frame-like portion is configured and arranged as the fixing portion fixed by the joining material 10.

Figure 7:
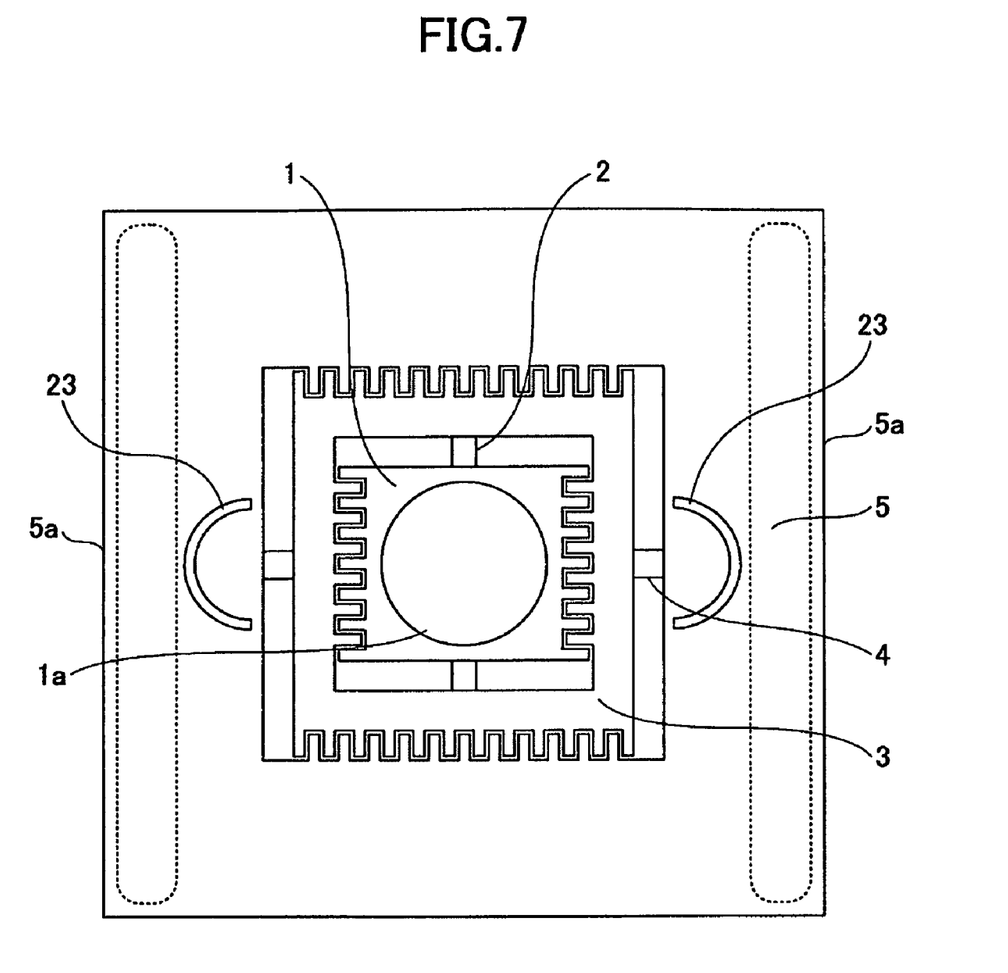
FIG. 7 is a plan view of a micro mirror device, which is an example of a micro electro mechanical device according to a second embodiment.

Next, a description will be given of a micro electro mechanical device according to a second embodiment. FIG. 7 is a plan view of a micro mirror device, which is an example of the micro electro mechanical device according to the second embodiment.

Semicircular elongated openings 23 are provided in the outer frame 5 of the micro mirror device illustrated in FIG. 7 instead of the straight elongated openings 20 illustrated in FIG. 3. By forming the semicircular elongated openings 23, each semicircular elongated opening 23 (corresponding to the first opening) exists between each torsion bar 4 and the corresponding fixing portion. That is, the semicircular elongated opening 23 always exists on the straight line connecting an arbitrary position in the fixing portion (the area encircled by a dotted line) of the outer frame 5 to the torsion bar 4. Accordingly, even with the semicircular elongated openings 23, an effect the same as the straight elongated opening 20 in the above-mentioned first embodiment can be obtained.

It should be noted that the semicircular elongated opening 23 is not limited to the semicircular shape, and any shape can be used if it can surround the torsion bar 4. For example, the semicircular elongated opening 23 can be a curved shape having a concave curve facing the torsion bar 4, or a channel shape having an open side facing the torsion bar 4.

Figure 8:
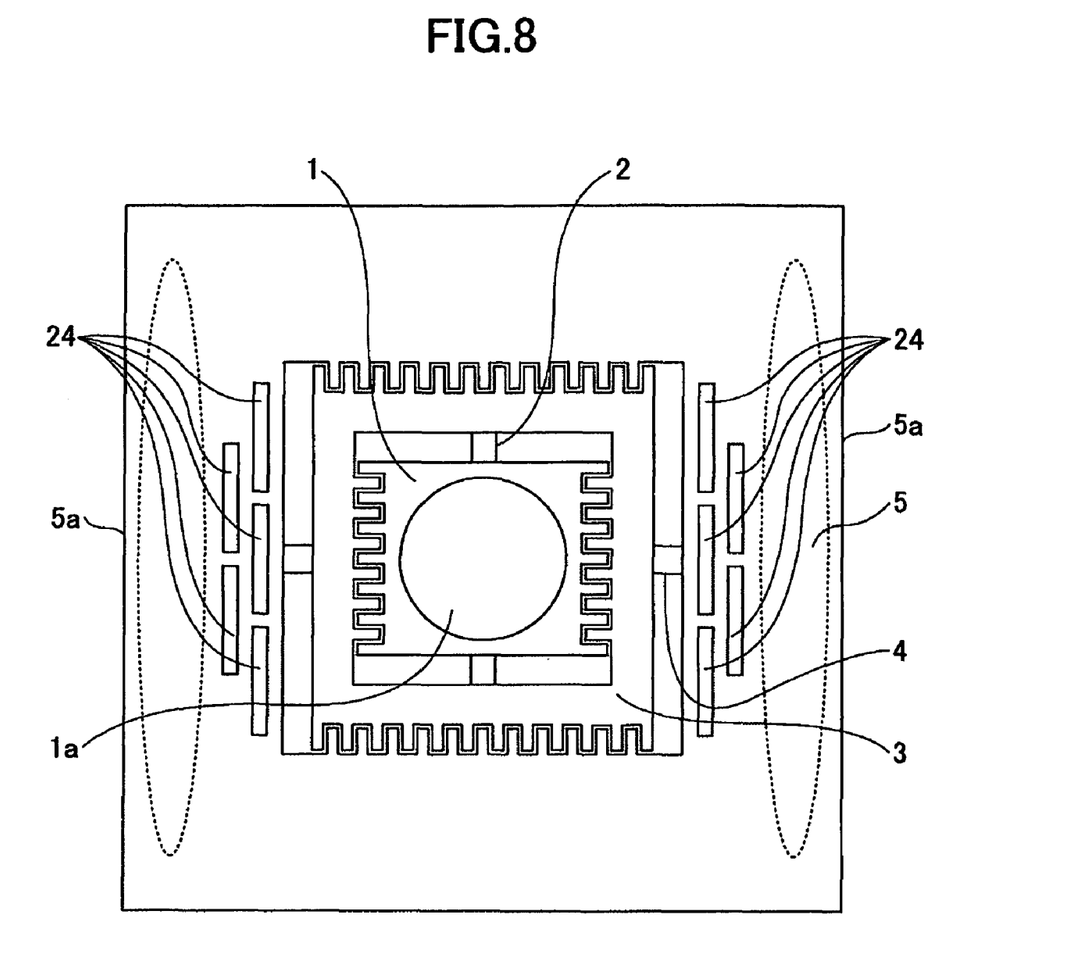
FIG. 8 is a plan view of a micro mirror device, which is an example of a micro electro mechanical device according to a third embodiment.

A description will now be given of a micro electro mechanical device according to a third embodiment. FIG. 8 is a plan view of a micro mirror device, which is an example of the micro electro mechanical device according to the third embodiment. In FIG. 8, parts that are the same as the parts illustrated in FIG. 3 are given the same reference numerals, and descriptions thereof will be omitted.

A plurality of small openings 24 are provided in the outer frame 5 of the micro mirror device illustrated in FIG. 8 instead of the straight elongated openings 20 illustrated in FIG. 3. The plurality of small openings 24 are arranged so that, when drawing a straight line from an arbitrary position in the fixing portion (area encircled by a dotted line) of the outer frame 5 to the torsion bar 4, at least one of the small openings 24 exists on the straight line. By providing the plurality of small openings 24 instead of the single large opening 20, the opening can be formed without greatly reducing the strength of the outer frame 5. Thus, even with the plurality of small opening 24 having a slit-like shape, an effect the same as the straight elongated opening 20 in the above-mentioned first embodiment can be obtained.

Figure 9:
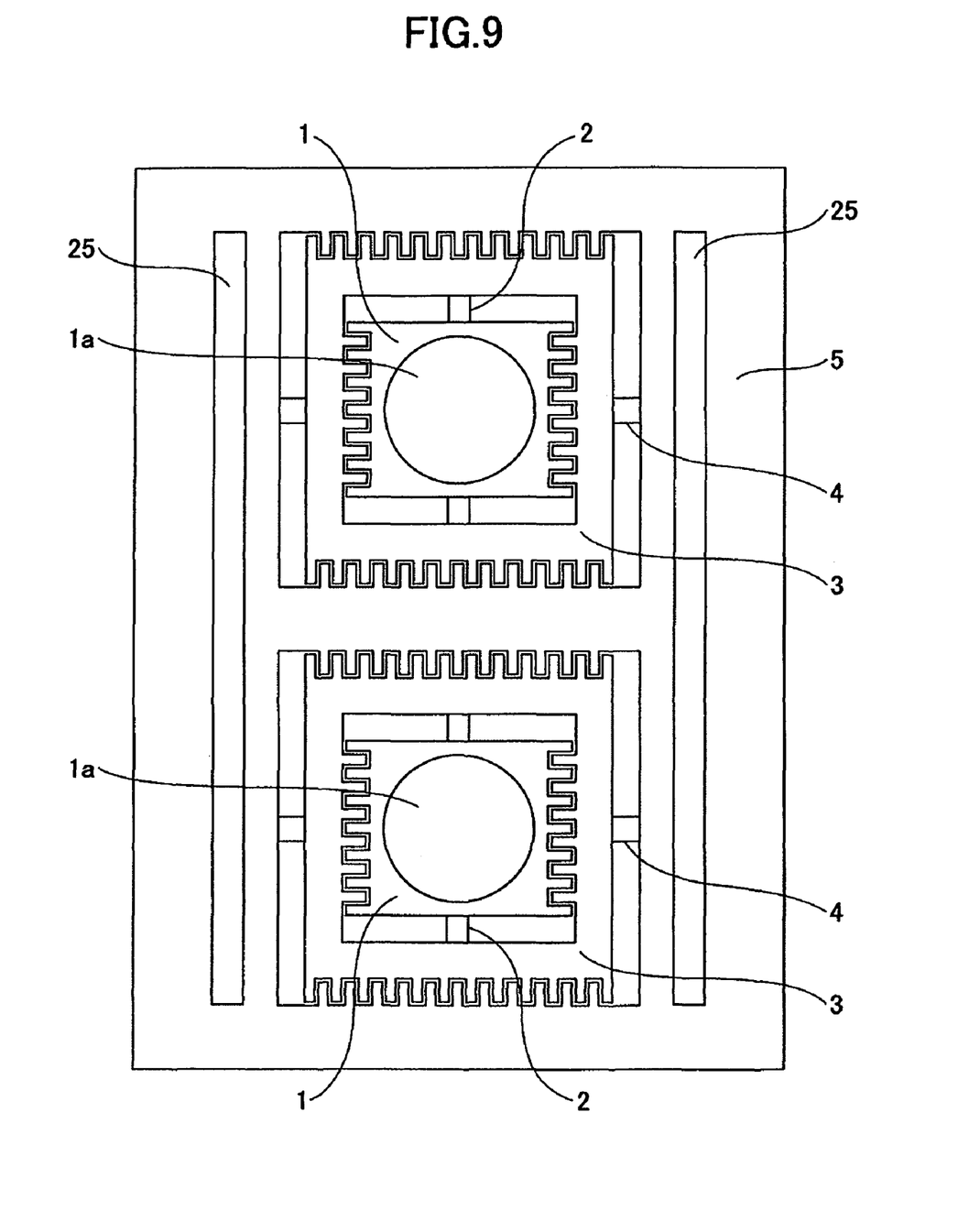
FIG. 9 is a plan view of a micro mirror device, which is an example of a micro electro mechanical device according to a fourth embodiment.

Next, a description will be given of a micro electro mechanical device array according to a fourth embodiment. FIG. 9 is a plan view of a micro mirror device array, which is an example of the micro electro mechanical device array according to the fourth embodiment. In FIG. 9, parts that are the same as the parts illustrated in FIG. 3 are given the same reference numerals, and descriptions thereof will be omitted.

In the micro mirror device array illustrated in FIG. 9, two pieces of the micro mirror device illustrated in FIG. 3 are formed in alignment in a single sheet of substrate. The direction of alignment of the two micro mirror devices is an extending direction of the torsion bars 2. Accordingly, the torsion bars 4 extend in a direction perpendicular to the direction of alignment of the micro mirror devices, and the fixing portions (areas encircled by dotted lines) of the outer frame 5 are provided along the sides 5a of the outer frame along the direction of alignment of the micro mirror devices.

In the micro mirror device array containing the micro mirror devices arranged as mentioned above, an elongated opening 25 is provided between a side 5a of the outer frame 5 and the corresponding torsion bar 4. The opening 25 extends over almost the entire length of the side 5a so that one elongated opening 25 covers torsion bars 4 of the two aligned micro mirror devices. That is, each elongated opening 25 corresponds to a shape of two elongated openings 20 illustrated in FIG. 3 connected to each other in a longitudinal direction. By providing the elongated openings 25 in the outer frame 5, an effect the same as the elongated openings 20 illustrated in FIG. 3 can be obtained.

It should be noted that, although two pieces of the micro mirror device are formed in a single sheet of substrate in the example illustrated in FIG. 9, the number of micro mirror devices is not limited to two, and three or more pieces of the micro mirror device may be formed in alignment so as to form a micro mirror device array. In such a case, one elongated opening is formed on one side of the three or more pieces of the micro mirror device.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A micro electro mechanical device comprising:
    an inner frame provided with a movable part;
    an outer frame provided in a circumference of the inner frame with a frame opening formed between said inner frame and said outer frame, and having a fixing part being fixed by a joining material;
    a first torsion bar connecting outer frame and said inner frame by extending through said frame opening to support said inner frame on said outer frame so that said inner frame can swing relative to said outer frame; and
    a first opening formed in said outer frame in a vicinity of the first torsion bar,
    wherein the first opening is positioned between said fixing part of said outer frame and said frame opening through which said first torsion bar extends,
    wherein, when drawing a line from an arbitrary position of said fixing part to said first torsion bar, said first opening is configured and arranged to be positioned on the line,
    wherein said first opening has a shape to surround said first torsion bar, and
    wherein said first opening has an elongated semicircular shape having a center at a position of said first torsion bar.

2. The micro electro mechanical device according to claim 1, wherein a corner of said first opening is rounded.

3. The micro electro mechanical device according to claim 1, wherein a vertical comb-shaped electrode actuator is formed in a portion where said inner frame and said outer frame face each other and in a portion other than the portion where said first torsion bar extends, and a second opening is formed in said outer frame between said vertical comb-shaped electrode actuator and said fixing part of said outer frame.

4. The micro electro mechanical device according to claim 1, wherein a second opening is formed in said outer frame and a third opening is formed in said outer frame between said first opening and said second opening, and wherein said first opening, said second opening and said third opening are arranged to surround said inner frame.

5. A micro electro mechanical device array comprising:
    a single substrate; and
    a plurality of micro electro mechanical devices aligned on said single substrate,
    wherein each of said micro electro mechanical devices includes:
        an inner frame provided with a movable part,
        an outer frame provided in a circumference of the inner frame with a frame opening formed between said inner frame and said outer frame, and having a fixing part being fixed by a joining material,
        a first torsion bar connecting said outer frame and said inner frame by extending through said frame opening to support said inner frame on said outer frame so that said inner frame can swing relative to said outer frame, and
        a first opening formed in said outer frame in a vicinity of the first torsion bar
        wherein the first opening is positioned between said fixing part of said outer frame and said frame opening through which said first torsion bar extends, and
        wherein said first opening is formed as a single elongated opening extending in a direction of alignment of said micro electro mechanical devices.

6. The micro electro mechanical device array according to claim 5, wherein said first torsion bar extends in a direction perpendicular to the direction of alignment of said micro electro mechanical devices, and said elongated opening is formed in said outer frame on both sides of said inner frames of said aligned micro electro mechanical devices.

7. A micro mirror device comprising:
    a movable part having a mirror;
    an inner frame surrounding said movable part;
    a pair of second torsion bars provided between said movable part and said inner frame to support said movable part on said inner frame so that said movable part can swing relative to said inner frame;
    a second vertical comb-shaped electrode actuator formed between said movable part and said inner frame;
    an outer frame surrounding said inner frame with a frame opening formed between said inner frame and said outer frame;
    a pair of first torsion bars connecting said inner frame and said outer frame by extending through said frame opening to support said inner frame on said outer frame so that said inner frame can swing relative to said outer frame; and a first vertical comb-shaped electrode actuator formed between said inner frame and said outer frame,
wherein said outer frame has a fixing part that is fixed to an external part by a joining material, and a first opening is formed in said outer frame between said fixing part and said frame opening through which each of said first torsion bars extends.

8. A micro electro mechanical device comprising:
an inner frame provided with a movable part;
an outer frame provided in a circumference of the inner frame having a fixing part being fixed by a joining material;
a first torsion bar provided the outer frame and said inner frame to support said inner frame on said outer frame, so that said inner frame can swing relative to said outer frame; and
a first opening formed in said outer frame in a vicinity of the first torsion bar,
wherein, when drawing a line from an arbitrary position of said fixing part to said first torsion bar, said first opening is configured and arranged to be positioned on the line,
wherein said first opening has a shape to surround said first torsion bar, and
wherein said first opening has an elongated semicircular shape having a center at a position of said first torsion bar.

9. A micro electro mechanical device array comprising:
a single substrate; and
a plurality of micro electro mechanical devices aligned on said single substrate,
wherein each of said micro electro mechanical devices includes an inner frame provided with a movable part; an outer frame provided in a circumference of the inner frame and having a fixing part being fixed by a joining material; a first torsion bar provided between the outer frame and said inner framed to support said inner frame on said outer frame, so that said inner frame can swing relative to said outer frame; and a first opening formed in said outer frame in a vicinity of the first torsion bar, and
wherein the first opening is positioned between said fixing part of said outer frame and said first torsion bar,
wherein said first opening is formed as a single elongated opening extending in a direction of alignment of said micro electro mechanical devices.

10. The micro electro mechanical device array according to claim 9, wherein said first torsion bar extends in a direction perpendicular to the direction of alignment of said micro electro mechanical devices, and said elongated opening is formed in said outer frame on both sides of said inner frames of said aligned micro electro mechanical devices.

11. A micro electro mechanical device comprising:
an inner frame provided with a movable part;
an outer frame provided in a circumference of the inner frame with a frame opening formed between said inner frame and said outer frame, and having a fixing part being fixed by a joining material;
a first torsion bar connecting said outer frame and said inner frame by extending through said frame opening to support said inner frame on said outer frame so that said inner frame can swing relative to said outer frame; and
a first opening formed in said outer frame in a vicinity of the first torsion bar,
wherein the first opening is positioned between said fixing part of said outer frame and said frame opening through which said first torsion bar extends,
wherein said first opening is formed as a single elongated opening extending in a direction of alignment of a plurality of said micro electro mechanical devices,
wherein, when drawing a line from an arbitrary position of said fixing part to said first torsion bar, said first opening is configured and arranged to be positioned on the line,
wherein said first opening has a shape to surround said first torsion bar, and
wherein said first opening has an elongated semicircular shape having a center at a position of said first torsion bar.

12. The micro electro mechanical device according to claim 11, wherein a corner of said first opening is rounded.

13. The micro electro mechanical device according to claim 11, wherein a vertical comb-shaped electrode actuator is formed in a portion where said inner frame and said outer frame face each other and in a portion other than the portion where said first torsion bar extends, and a second opening is formed in said outer frame between said vertical comb-shaped electrode actuator and said fixing part of said outer frame.

14. The micro electro mechanical device according to claim 11, wherein a second opening is formed in said outer frame and a third opening is formed in said outer frame between said first opening and said second opening, and wherein said first opening, said second opening and said third opening are arranged to surround said inner frame.

* * * * *

UNITED STATES PATENT AND TRADEMARK OFFICE
CERTIFICATE OF CORRECTION

PATENT NO. : 8,179,582 B2
APPLICATION NO. : 12/382133
DATED : May 15, 2012
INVENTOR(S) : Yasuhiro Omori et al.

It is certified that error appears in the above-identified patent and that said Letters Patent is hereby corrected as shown below:

Column 9, Line 13, In Claim 8, after "provided" insert -- between --.

Signed and Sealed this
Twenty-sixth Day of February, 2013

Teresa Stanek Rea
*Acting Director of the United States Patent and Trademark Office*